J. SPRINGER.
PNEUMATIC CLUTCH.
APPLICATION FILED JULY 23, 1914.

1,185,258.

Patented May 30, 1916.
2 SHEETS—SHEET 1.

WITNESSES:

INVENTOR
John Springer
BY
ATTORNEY

J. SPRINGER.
PNEUMATIC CLUTCH.
APPLICATION FILED JULY 23, 1914.

1,185,258.

Patented May 30, 1916.
2 SHEETS—SHEET 2.

WITNESSES:
W. K. Frad
James P. Barry

INVENTOR
John Springer

BY
Whittemore Hulbert & Whittemore
ATTORNEY

UNITED STATES PATENT OFFICE.

JOHN SPRINGER, OF DETROIT, MICHIGAN.

PNEUMATIC CLUTCH.

1,185,258.   Specification of Letters Patent.   Patented May 30, 1916.

Application filed July 23, 1914. Serial No. 852,721.

*To all whom it may concern:*

Be it known that I, JOHN SPRINGER, a citizen of the United States of America, residing at Detroit, in the county of Wayne and State of Michigan, have invented certain new and useful Improvements in Pneumatic Clutches, of which the following is a specification, reference being had therein to the accompanying drawings.

The invention relates to pneumatic clutches of that type involving an air compressor arranged between the drive and driven members, and a storage for the compressed air, the power being transmitted through the medium of the compressed air which is raised to a pressure balancing the load.

The present invention comprises various features by which certain defects of constructions heretofore used are overcome, and including, first, the reduction of the clearance volume or storage, so that the clutch will pick up its load more rapidly; second, the placing of the full accumulated pressure upon each piston at the beginning of its effective stroke; third, the more perfect balancing of parts, whereby the operation is not affected by centrifugal action; and fourth, the improvement in various details of construction as more fully hereinafter set forth.

Figure 1:
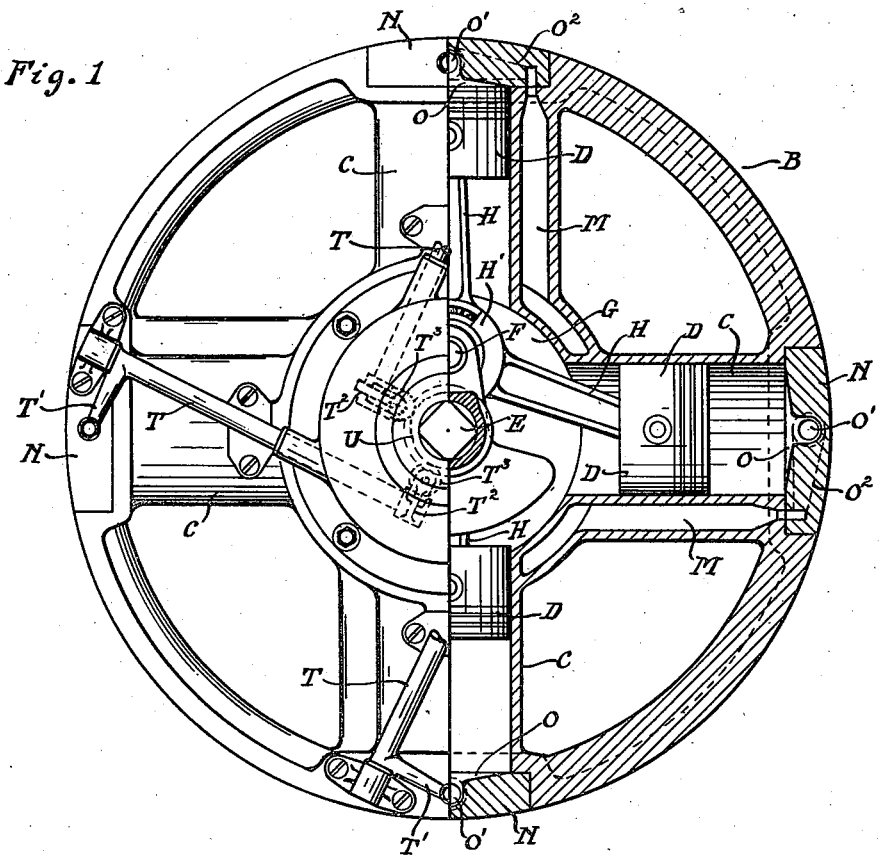
Figure 3:
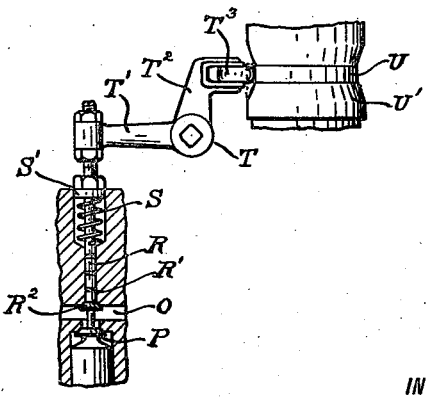
Figure 2:
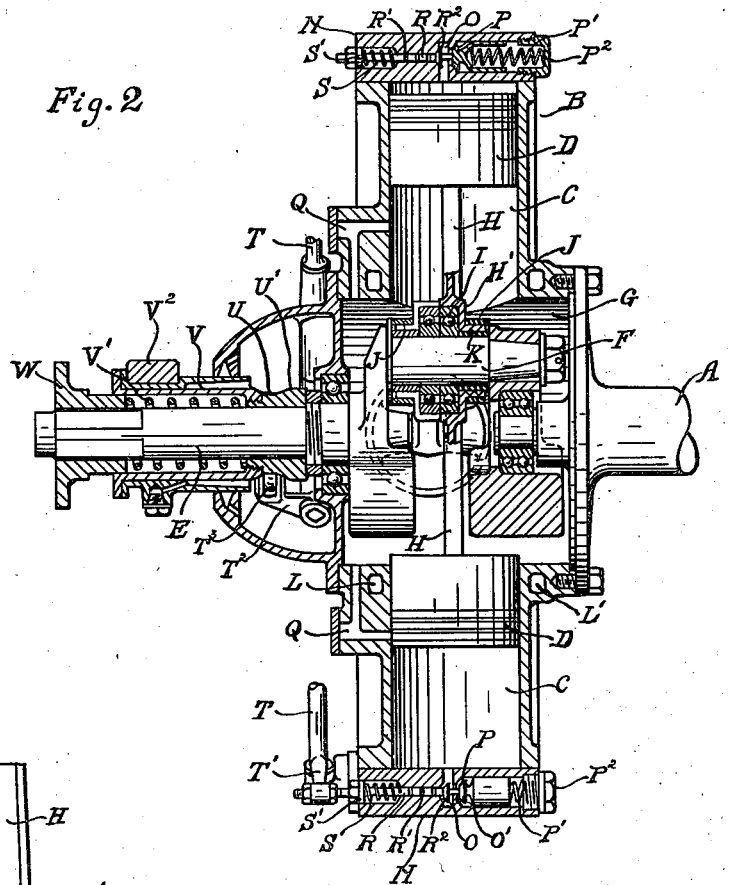
Figure 5:
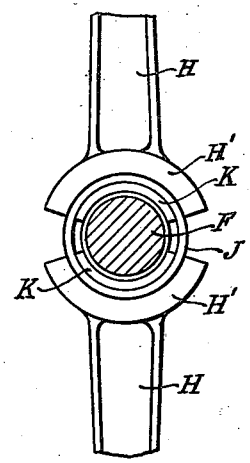
Figure 4:
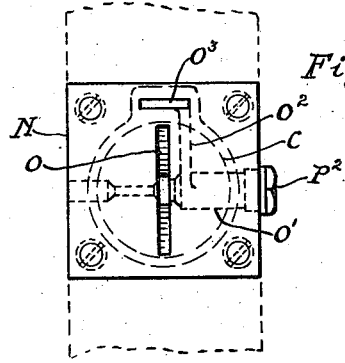

In the drawings: Figure 1 is a sectional elevation parallel to the plane of rotation of the clutch; Fig. 2 is a section in the plane of the axis; Fig. 3 is a sectional elevation showing the operation of the valve mechanism; and Fig. 4 is a plan view of one of the cylinder heads. Fig. 5 is a detail view showing how in my invention connecting rods are engaged in pairs with the crank of the engine shaft.

A is the drive shaft, such for instance as the crank shaft of an engine.

B is a rotary head mounted upon this shaft and constituting the fly-wheel therefor. This head is provided with a plurality of radially-extending cylinders C in each of which is arranged a piston D.

E is the driven shaft which is axially alined with the shaft A and is provided with a crank F arranged within a central recess G in the head B. The crank F is connected to the pistons D through the medium of pitman rods H and anti-friction bearings I constructed and arranged as follows: One difficulty which has been heretofore experienced is the rapid wear of the crank bearings. This is due to the fact that these bearings are not easily lubricated, for the centrifugal action tends to throw off the lubricant, resulting in the seizure of the relatively moving parts. The substitution of roller bearings for parallel bearings will avoid this difficulty, but another difficulty is involved to properly mount said bearings within the space limits. With my improved construction, I first arrange the cylinders in pairs, which are in the same plane and diametrically opposite each other. The pitman rods for these cylinders are therefore in the same plane and are provided with segmental heads H', which engage opposite sides of the ball bearing I, being cut away to provide clearance sufficient for the relative angular movement of the rods. The rods of each pair are then connected to each other by rings J which embrace laterally-extending segmental flanges K. The several pairs of opposed cylinders are arranged in slightly different planes, so that their rods may be arranged adjacent to each other and engage adjacent portions of the crank F. Thus the ball bearings I which are directly in the plane of the pitman rods receive the maximum stress, which is the compression stress and both reduce the friction and prevent wear even where the lubrication is slight. On the other hand, the tension stress is taken care of by the engagement between the rings J and flanges K, while the whole structure is one which permits of mounting upon a crank pin of comparatively short length.

A relative movement of the drive shaft A and driven shaft E will cause the reciprocation of the pistons in the cylinders, which movement will be resisted by the compression of the contained volume of air. To give flexibility, a clearance volume is provided for receiving the air compressed in each cylinder, but this volume is so restricted that the pressure will rapidly rise to balance the load. I preferably form this clearance volume or storage by cored chambers formed in the head B, and, as shown, annular chambers L and L' are arranged around the crank chamber within said head and are connected with longitudinal passages M in the walls of each cylinder. The passages M are connected with the cylinders C by valve-controlled ports, these being perferably located in detachable heads N for said cylinders. As shown in Figs. 1 and 4, the heads N engage transversely-milled slots in the periphery of the head B and externally conform to the contour of the latter. Each head is provided with a port O for communicating with the end of the cylinder and a transverse bore O' which connects said port with a laterally-extending cored passage $O^2$ communicating through a port $O^3$ with the passage M. Within the lateral bore O' is arranged a check valve P which is held to its seat by the tension of a spring P' abutting at one end against a plug $P^2$ which closes the end of the bore and at the other end against a cylindrical guide portion of the valve P, loosely fitting the bore. Thus the air which is compressed by each piston as it moves outward in the cylinder will be forced beyond the check valve P and will accumulate in the clearance space formed by the passages L L' and M. The pressure will rise with each succeeding volume which is compressed, and as the clearance volume is small the resistance will rapidly rise until it balances the load.

To render the operation of each piston more effective, I have provided, first, means for utilizing the suction as well as the compression stroke; and second, means for placing against the piston at the beginning of its compression stroke the full accumulated pressure of the air previously stored. The first effect is produced by locating the inlet port for the cylinder adjacent to the end of the suction stroke or inward limit of movement, and as shown, a port Q is provided for each cylinder which communicates with the crank chamber G. The second effect is produced by means for unseating each of the valves P at the beginning of the compression stroke of each piston just after said piston has passed the port Q, so as to close the same.

For unseating the valves P, valve rods R are arranged in bores which are alined with the bores O and extend outward from the opposite side of the head B. The rods R have portions which closely fit the bore and are grooved at R' to hold a sealing and lubricating fluid which prevents leakage of air. Each rod is also provided with a sealing shoulder $R^2$ which in normal position engages a seat forming a complete air seal. Near the outer ends of the rods R are springs S which are arranged in counterbores and bear against collars S' on the rods, the tension of the spring acting to hold the shoulder $R^2$ to its seat. T are rock-shafts extending in a substantially radial direction across one end of the head B, their outer ends being provided with rock-arms T' adapted to engage with the rods R. The inner ends of these rock-shafts have secured thereto the rock-arms $T^2$ which extend substantially parallel to the shaft E and carry at their free ends anti-friction rollers $T^3$. These rollers engage a cam U which is sleeved upon the shaft E so as to rotate therewith, and the cam is so fashioned as to engage with the roller $T^3$ once in each revolution, rocking the arm $T^2$, shaft T and arm T', and moving the rod R inward against the tension of the spring S, so as to unseat the valve P. The timing of the parts is such that this valve is unseated just after the piston has closed the port Q, as before described, and consequently the full pressure of the accumulated volume of compressed air will operate against the piston during substantially its complete compression stroke.

Whenever the clutch is released, it is necessary to exhaust the accumulated compressed air and also to vent the cylinders during the compression and suction strokes of the pistons by simultaneously unseating the valves P. The exhausting of the compressed air will then take place through the ports Q, as the pistons complete their suction strokes, while on the compression strokes the cylinders will vent to the spaces M and L L'. This is accomplished by providing the cam U with an adjacent, annular, tapering portion U' and by also providing means for shifting the sleeve longitudinally upon the shaft E so as to bring this annular portion in engagement with all of the rolls $T^3$. As shown, the cam U is attached to a hollow sleeve V within which is arranged a spring V' surrounding the shaft and abutting at one end against the collar W fixed to said shaft. The sleeve V is grooved to receive a non-rotating collar $V^2$, which may be connected by any suitable mechanism, not shown, to the clutch-releasing pedal.

In operation, when motion is first communicated to the shaft A it will cause the rotation of the head B carrying with it the cylinders and pistons. If the driven shaft E is under load it will remain stationary, thereby causing the crank F to actuate the pitman rods H and pistons D in each of the revolving cylinders. Each suction stroke of the piston will cause a vacuum and thereby introduce the resistance of atmospheric pressure, while each compression stroke will compress the volume of air in the cylinder and force it past the check valve P into the clearance spaces M and L L'. At the start the air in the cylinder and in the clearance space is at atmospheric pressure, but as each volume of air is compressed and introduced into the clearance space, the pressure will rise, and, as has been explained, the subsequent compression strokes of the piston will operate against this raised pressure instead of merely operating against atmospheric pressure. Thus the efficiency of each cylinder and piston is greatly increased, with the result that the size of the construction necessary to take care of a given maximum load may be correspondingly reduced.

To release the clutch, the sleeve V is moved longitudinally, causing the annular portion U' of the cam to simultaneously raise all of the valves P from their seats, which will exhaust the accumulated compressed air and vent each of the cylinders, so as to interpose no resistance to the movement of the piston.

During the rapid rotation of the clutch the lubricating oil for the pistons within the cylinders will be thrown outward to a greater or less extent by centrifugal action and would tend to accumulate in the ends of the cylinders if the latter were perfectly square. This might form an obstruction to the full stroke of the piston, and I have therefore avoided the difficulty by so shaping the ports in the heads of the cylinders to form drain channels for the oil. Thus as shown in Fig. 1, the ports O are inclined from the periphery of the cylinder toward the center, so that any oil thrown to the end of the cylinder will drain through this port into the transverse bore O' or out of the path of the piston.

What I claim as my invention is:—

1. In a pneumatic clutch, the combination with a drive and a driven member, of air compression means interposed between said members, a storage for receiving and holding the compressed air, and means for placing the cumulative pressure of said storage upon said air compression means during the initial portion of each compression stroke.

2. In a pneumatic clutch, the combination with the drive and a driven member, of air compression means interposed between said members, having alternating compression and suction strokes, a storage for receiving and holding the compressed air, and means for admitting the air to be compressed into said compression means at the end of the suction stroke and for placing the cumulative pressure of said storage upon said compression means during the initial portion of the compression stroke.

3. In a pneumatic clutch, the combination with rotary drive and driven members, of a radially arranged air compressor connected to be actuated by a relative movement of said members, a valve controlling said compressor located at the outer end thereof and movable transverse to the plane of rotation, means automatically operating the valve in timed relation to the relative rotation of the drive and driven members, and means for controlling the valve manually.

4. In a pneumatic clutch, the combination with a drive and a driven member, of interposed air compression means, a storage for receiving and holding the cumulative pressure, and means for placing said cumulative pressure upon said air compression means after the reception of the volume of atmospheric air to be compressed and during the initial portion of the compression stroke.

5. In a pneumatic clutch, the combination with a drive and a driven member, of air compression means interposed therebetween and having alternating suction and compression strokes, a storage for receiving and holding the cumulative pressure of successive compression strokes, means for delaying the admission of atmospheric air during the suction stroke to oppose atmospheric resistance thereto, and means for placing the cumulative pressure of said storage upon said compression means during the initial operation of each compression stroke.

6. A pneumatic clutch, comprising a drive and a driven member, a series of reciprocatory air compressors operated by a relative movement of said drive and driven members, a storage for receiving and holding the successively compressed volumes of air, and means for cutting off communication between said storage and air compressors during each suction stroke and for placing the same in communication during the initial portion of each compression stroke.

7. A pneumatic clutch, comprising alined drive and driven shafts, a head or casing mounted upon one of said shafts, chambered to form an air storage, a series of radially arranged air compression cylinders mounted upon said head, pistons in said cylinders, a crank upon the other of said shafts to which said pistons are connected, check valves controlling communicating passages between each of said cylinders and said air storage, and means for automatically opening said valves successively and during the initial portion of the compression stroke of their respective pistons.

8. A pneumatic clutch, comprising alined drive and driven shafts, a head forming a fly-wheel for said drive shaft, provided with a series of radially-arranged cylinders and chambered to form a limited air storage, pistons in said cylinders, a crank on said driven shaft, pitman rods connecting said pistons with said crank, check valves controlling passages between the respective cylinders and said air storage, means for automatically opening said valves successively during the initial portion of the compression stroke of the corresponding piston, and manually-operable means for simultaneously opening all of said valves to vent said air storage and cylinders.

9. In a pneumatic clutch, the combination with rotary drive and driven members, of a radially arranged air compressor connected to be actuated by a relative movement of said members, a valve controlling said compressor located at the outer end thereof and movable transverse to the plane of rotation, a sliding cam mounted to be rotated by one of said members, a mechanism actuated by said cam normally operating said valve in timed relation to the relative rotation of the drive and driven members, and manually actuated means for shifting the cam to an inoperative position relative to said mechanism.

10. In a pneumatic clutch, the combination with a drive and a driven member, of an interposed reciprocatory air compressor, having alternating suction and compression strokes, a storage for receiving and holding the compressed air, a check valve controlling communication between said storage and air compressor, and automatic means for opening said valve during the initial portion of each compression stroke.

11. In a pneumatic clutch, the combination with rotary drive and driven members, of an interposed radially-arranged reciprocatory air compressor, a valve for controlling said compressor arranged at the outer end thereof, an actuating member for said valve located near the axis of said rotary members and movable longitudinally thereof, and a rock shaft having rock-arms thereon for transmitting movement from said actuating member to said valve.

12. In a pneumatic clutch, the combination with alined drive and driven shafts, of a rotary head mounted on one of said shafts having a series of radially-arranged air compressors operated by the relative movement of said shafts, valves for controlling said compressors located at the periphery of said head, an actuating member for said valves sleeved about one of said shafts and movable longitudinally thereof, rock-shafts extending substantially in a radial direction having rock-arms for engaging said actuating member and oppositely extending rock-arms for actuating said valves, and rods extending transverse to the plane of rotation arranged intermediate the latter rock-arms and said valves.

13. In a pneumatic clutch, the combination with a drive and driven member, of an interposed reciprocatory air compressor, having alternating suction and compression strokes, and means for delaying the admission of air to said air compression means until the completion of each suction stroke to interpose atmospheric resistance thereto.

14. In a pneumatic clutch, the combination with rotary drive and driven members, of a radially-arranged air compressor actuated by a relative movement of said members, a ported head for the outer end of said compressor having transversely-extending, alined bores, a check valve in one of said bores controlling the ports of said head, and an actuating rod extending out from said head through the alined bore, having a normally seated sealing shoulder for preventing leakage of air.

15. In a pneumatic clutch, the combination with rotary drive and driven members, of a radially arranged air compressor connected to be actuated by the relative movement of said members, a valve controlling said compressor located at the outer end thereof, and a port leading to said valve forming also a drain channel for the lubricating oil thrown outward by centrifugal action, thereby preventing accumulation of oil in the path of the piston.

16. In a pneumatic clutch, the combination with rotary drive and driven members, of a radially arranged air compressor connected to be actuated by the relative movement of said members and comprising a cylinder and piston therein, and means for draining the lubricating oil thrown outward by centrifugal action to the end of said cylinder to prevent obstruction of said piston.

17. In a pneumatic clutch, the combination with a drive and a driven member, of an interposed reciprocatory air compressor, having alternating suction and compression strokes, a storage for receiving and holding the compressed air, a check valve controlling communication between said storage and air compressor, automatic means for opening said valve during the initial portion of the compression stroke, and means for manually controlling said valve.

18. In a pneumatic clutch, the combination with a drive and a driven member, of an interposed air compressor comprising a plurality of radial cylinders mounted rigidly upon one of said shafts, pistons in said cylinders, a crank upon the other shaft, pitman rods connecting said pistons with said crank, a storage for receiving and holding the compressed air, check valves controlling passages between the respective cylinders and said air storage, means for automatically opening said valves successively during the initial portion of the compression strokes of the corresponding pistons, and manually operable means for simultaneously opening all of said valves.

19. In a pneumatic clutch, the combination with a head or casing, comprising a plurality of cylinders radially mounted between hub and rim members, the latter being chambered to form a crank case, and having an interior air storage chamber, communicating with each cylinder through a longitudinal passage in the wall thereof, pistons mounted in said cylinders, and means for cutting off communication between each cylinder and the longitudinal passage thereof, during each suction stroke of the corresponding piston, and for establishing communication between the same during the initial portion of each compression stroke.

20. In a pneumatic clutch, the combination with rotary drive and driven members, of a radially arranged air compressor connected to be actuated by a relative movement of said members, a valve controlling said compressor located at the outer end thereof and movable transverse to the plane of rotation, and means automatically operating the valve in timed relation to the relative rotation of the drive and driven members.

In testimony whereof I affix my signature in presence of two witnesses.

JOHN SPRINGER.

Witnesses:
 JAMES P. BARRY,
 HENRIETTA E. BOWMAN.